April 7, 1964 R. A. GREINER 3,128,395
SQUARE WAVE GENERATOR EMPLOYING REVERSE-BIASED DIODES
AT TRANSISTOR INPUT TO PRODUCE SYMMETRICAL OUTPUT
Filed May 8, 1961

TYPICAL TRANSISTOR CHARACTERISTIC

DIODES WITH PROPER BIAS

DIODES WITH EXCESSIVE REVERSE BIAS

INVENTOR.
Richard A. Greiner
BY
Andrus & Starke
Attorneys 3,128,395

SQUARE WAVE GENERATOR EMPLOYING REVERSE-BIASED DIODES AT TRANSISTOR INPUT TO PRODUCE SYMMETRICAL OUTPUT

Richard A. Greiner, Madison, Wis., assignor to Gisholt Machine Company, Madison, Wis., a corporation of Wisconsin Filed May 8, 1961, Ser. No. 108,403
6 Claims. (Cl. 307—88.5)

This invention relates to a transistorized amplifying circuit and is particularly directed to means for maintaining the zero cross-over points of the output signal in correspondence with the input signal.

In control circuits and the like, a square wave signal may be generated from an alternating or periodic current input signal. For example, in the balancing equipment illustrated in the United States Patent 2,165,024 to Baker, the angle of unbalance is detected by establishing an alternating current signal in phase with the unbalance in a rotating assembly. The alternating current signal energizes a suitable squaring circuit which establishes a square wave output for operating a suitable detector in accordance with a zero cross-over point in the square wave. The square wave signal must be held in accurate correspondence with the unbalance generated signal to maintain the correspondence between the zero cross-over points of the input signal and the square wave signal for obtaining a high degree of accuracy in the location of unbalance.

Squaring circuits of the electronic type include an overdriven amplifier having an alternating current input with the upper portion of each half cycle clipped or removed to establish a correspondingly phased square signal output. Transistors have recently been developed to replace vacuum tubes in many electronic circuits. A capacitor coupling is widely employed.

Transistors which are capacitive coupled to an alternating type signal and biased to a zero output current prior to the application of an input signal, shift the zero crossover point between the input and the output signals. A transistor presents a non-linear and non-symmetrical load characteristic to the input. One half-cycle of the voltage signal has a polarity which requires small current input whereas the opposite half-cycle has a polarity which requires a relatively large current input. With a capacitive coupling to the input of the transistor, the capacitor charges to a higher level during the one half-cycle than during the other half-cycle because of the difference in current taken during the two opposite polarities. The capacitor cannot pass a direct current and consequently, the bias of the capacitor is effectively shifted such that the current wave appears symmetrically about the shifted bias. The larger the input signal, the greater is the bias shift on the transistor. The non-linear and non-symmetrical input characteristic of the transistor thereby effectively shifts the zero cross-over points in the square wave output out of phase with the corresponding zero cross-over points in the input.

Signals employed in balancing equipment and the like are normally substantially amplified to increase the rise rate of the current signal adjacent the zero cross-over point and applied to a final squaring circuit to establish an essentially true square wave signal. Known transistor circuits therefore result in substantial shifting of the cross-over point in an A.C. signal.

In accordance with the present invention, diodes or other similar circuit means are interposed between the transistor and the coupling capacitor with the diodes connected to by-pass substantial portions of the alternate half-cycles of the input current from the transistor. The diodes are reverse biased to allow a relatively minute current flow into the transistor immediately adjacent the zero crossover point.

The diodes present a symmetrical load to the transistor. The characteristic of the diodes although non-linear because of the non-linear characteristics of the diodes, is symmetrical about the quiescent current point and consequently the coupling capacitor is equally charged during the negative and positive portions of the input signal. The bias voltage on the transistor does not shift and the zero cross-over point in the square wave is maintained in correspondence with the zero cross-over point in the A.C. input.

In accordance with the present invention, it is important that a slight bias of the diodes be accurately established. If the diodes are not biased to non-conduct adjacent the zero cross-over point, they prevent any current flow to the transistor and consequently no gain can be obtained. As previously noted, it is essential that the signal be amplified to establish a relatively steep rise of the current adjacent the zero cross-over point. If the bias on the diodes is excessive however, the transistor characteristic noticeably loads the capacitor and shifts the bias of the transistor.

The present invention maintains the zero cross-over point over a wide ratio of maximum to minimum input signals.

The present invention provides a very simple and inexpensive means for presenting a symmetrical load to the incoming signal which maintains the zero cross-over point in a transistorized squaring circuit.

The drawing furnished herewith illustrates the best mode presently contemplated for carrying out the invention.

Figure 1:
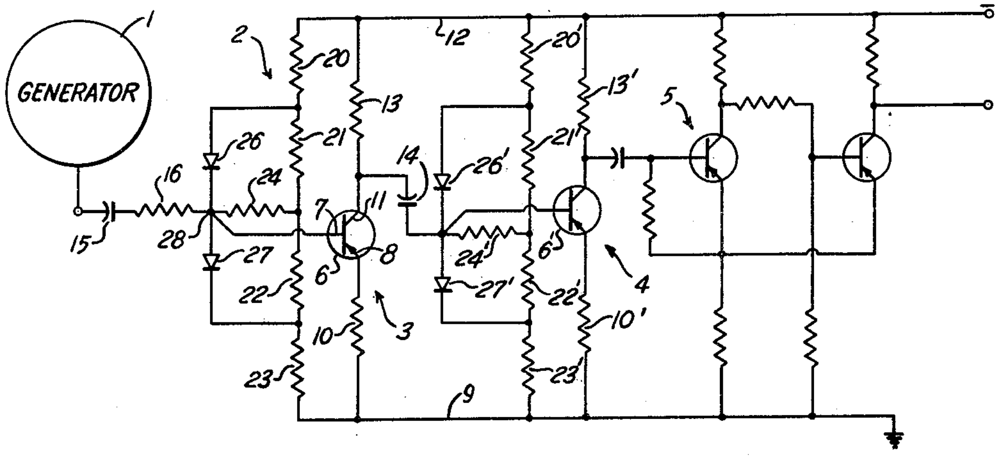
FIG. 1 is a schematic circuit diagram illustrating a squaring circuit constructed in accordance with the present invention.

Referring to the drawing and particularly to FIG. 1, a generator 1 is connected to a squaring circuit 2 constructed in accordance with the present invention.

The generator 1 is of any suitable construction adapted to establish a periodically varying signal having symmetrical negative and positive half-cycles. For example, the present invention has been employed in balancing equipment wherein an A.C. unbalance signal is generated in proportion to unbalance in rotating members.

The squaring circuit 2 includes a first overdriven transistor amplifier 3 and a second overdriven transistor amplifier 4 which are similarly constructed in accordance with the present invention, as hereinafter described. The amplifiers 3 and 4 are generally high gain, squaring amplifiers connected in cascade to establish an output signal rapidly passing through zero. A triggering circuit 5 is connected to the output of the second amplifier 4 and is adapted to establish a square wave signal having a very steep rise and fall time.

As previously noted, the transistor amplifiers 3 and 4 are similarly constructed and consequently only amplifier 3 is described in detail. The corresponding elements in amplifier 4 are correspondingly numbered for purposes of illustration and discussion.

Amplifier 3 includes a transistor 6 illustrated as a conventional PNP type and connected in a common emitter configuration. The transistor 6 includes a base 7 adapted to be connected to the input signal from the A.C. generator 1. The transistor 6 includes an emitter 8 which is connected to a ground line 9 in series with a swamping resistor 10 and a collector 11 connected to a negative bus 12 in series with a load resistance 13, in accordance with known practice. A capacitor 14 is connected to the collector 11 of transistor 6 and to the input base of the transistor in amplifier 4.

A series connected capacitor 15 and a resistor 16 connect the generator 1 to base 7 of transistor 6 and establish capacitive coupling of the signal from the generator.

Figures 2, 3, 4:
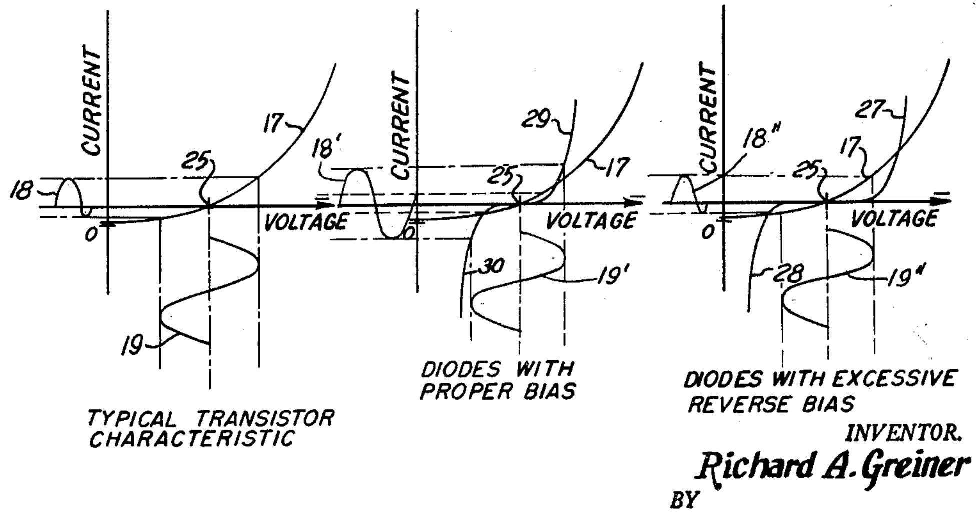
FIG. 2 is a typical input characteristic of a transistor.
FIG. 3 is the input characteristic of the transistor and a pair of diodes with a slight reverse bias on the diodes.
FIG. 4 is an illustration similar to FIG. 3 with an excessive reverse bias on the diodes which would cause shifting of the zero cross-over point.

Referring particularly to FIG. 2, an input characteristic curve 17 of a typical transistor 6 is diagrammatically illustrated. The value of the negative input voltages are shown along a horizontal axis and corresponding input currents are shown along a vertical axis. As the voltage increases in a negative direction, the current slowly increases from a relatively low value and crosses the quiescent operating point, as hereinafter described, and subsequently rises more and more rapidly. With the transistor operated adjacent the quiescent point of the input characteristic curve, a very non-linear and non-symmetrical characteristic is established. A slight increase in the voltage adjacent a quiescent point operating point results in a relatively large current. A corresponding decrease in voltage at the quiescent current operating point results in only a relatively minute current change. Consequently, an output current wave 18 as the result of a symmetrical input voltage wave 19 includes negative and positive half-cycles which have noticeably different amplitudes and in effect a D.C. current would tend to flow through the capacitor 15. Because a capacitor cannot transmit a D.C. current, the capacitor 15 charges to a value intermediate the maximum amplitudes of the negative and positive half-cycles of the input current and effectively shifts the voltage bias upwardly along the input characteristic curve 17. The effective shift of the bias on transistor 6 is proportional to the amplitude of the voltage signal applied to the transistor 6.

In accordance with the present invention, a bias correcting circuit is interposed between the capacitor 15 and the base 7 of transistor 6 to present and maintain a symmetrical load on the capacitor 15 which charges equally during the negative and positive half-cycles of input current. A symmetrical signal is then applied to the transistor 6 and the zero cross-over points in the output of the transistor 6 are in correspondence with the zero cross-over points in the input signal.

In the illustrated embodiment of the invention, the bias correcting circuit includes four biasing resistors 20–23 which are connected in series with each other between the negative bus 12 and the ground line 9. The resistors 20–23 constitute a voltage dividing circuit having different voltages at the junctions of the several resistors. The end resistors 20 and 23 are of the same resistance and the center resistors 21 and 22 are also of the same resistance. The base 7 of transistor 6 is connected to the junction of resistors 21 and 22 via a resistor 24 and is biased to the quiescent operating point 25 on the transistor characteristic.

A pair of diodes 26 and 27 are series connected with similar polarity connections across the center resistors 21 and 22. The central or common junction 28 of the diodes 26 and 27 is connected to the base 7 of transistor 6.

The voltage drop across the resistors 21 and 22 establishes a preselected similar reverse bias on the diodes 26 and 27.

The diodes 26 and 27 form a low impedance circuit which carries practically all of the input current from capacitor 15. The diodes 26 and 27 are oppositely polarized with respect to junction 28 and carry alternate half-cycles of the current. The load characteristic to the capacitor 15 is therefore symmetrical although non-linear as shown in FIG. 3.

Referring particularly to FIG. 3, the total diode input characteristic is illustrated with the diodes 26 and 27 slightly and equally reversely biased apart by the voltage across resistors 21 and 22.

The characteristic curve 29 above the quiescent operating point 25 is for the diode 26 and the characteristic curve 30 below the quiescent operating point is for the diode 27. Characteristic curves 29 and 30 are generally similar non-linear curves respectively rising and falling on opposite sides of the voltage axis as the voltage increases and decreases to the opposite side of the quiescent point 25. The reverse bias across the diodes 26 and 27 separate the characteristic curves 29 and 30 at the quiescent operating axis. The transistor characteristic curve 17 adjacent the quiescent position joins the characteristic curves 29 and 30 and illustrates the total characteristic of the circuit. During the change in the voltage immediately adjacent the quiescent point axis, current does not flow through the diodes 26 and 27. The current is fed to the transistor 6 during this portion of the cycle, as shown by curves 18′ and 19′. The horizontal dashed lines immediately above and below the line through point 25 give the signal current conducting period for the transistor and show the maximum current fed thereto, when superimposed on the curves 18′ and 19′ as shown in FIG. 3.

If the diodes 26 and 27 are not biased apart adjacent the quiescent operating point, they would carry practically all of the input current and effectively short circuit the transistor 6 from the circuit and prevent any gain. The small current fed to the base 7 of the transistor 6 is necessary to establish gain of the A.C. signal. If the signal is not amplified, the rise of the signal adjacent the zero cross-over point is not increased sufficiently to establish a true square wave signal.

However, if an excessive bias is applied to the diodes 26 and 27, the separation of the characteristic curves 29 and 30 increases and the transistor characteristic is applied to capacitor 15, as shown in FIG. 4. The transistor 6 then substantially loads the capacitor 15 in both a non-linear and a non-symmetrical manner and results in a shift of the transistor bias, as previously described and as shown by curves 18″ and 19″ in FIG. 4.

By proper selection of the bias on diodes 26 and 27, the non-symmetrical effect of transistor 6 can be effectively eliminated from the circuit. The zero cross-over point in the output of amplifier 3 is then in correspondence with the cross-over point in the signal from generator 1. The output of the amplifier 3 is connected by the capacitor 14 to amplifier 4 which is shown having the same structure as amplifier 3.

The amplifier 4 is employed to further increase the steepness of the signal adjacent the zero cross-over point in the A.C. signal. The output signal from amplifier 4 is applied to the triggering circuit 5 which, in accordance with known operation, creates a true square wave signal.

The operation of the illustrated embodiment of the invention is summarized as follows.

The signal from the generator 1 is coupled by the capacitor 15 to the base 7 of the transistor 6. The voltage divider consisting of resistors 20–23 biases the diodes 26 and 27 to conduct after the signal varies slightly above and below the quiescent voltage position. When the diodes 26 and 27 conduct, they constitute, for practical purposes, the entire load on the capacitor 15 and carry the input current. The diodes 26 and 27 present an essentially symmetrical, non-linear input characteristic to the capacitor 15, as shown in FIG. 3.

The input impedance of transistor 6 is relatively unimportant in comparison to the diodes 26 and 27 and the input characteristic of the transistor 6 is thereby made to appear as a symmetrical, non-linear characteristic. The maintenance of the symmetrical input characteristic establishes similar charging and discharging of the coupling capacitor 15 during the positive and negative half-cycles of the total signal from the generator 1 and eliminates any difference in the position of the cross-over points of the signal passing through the transistor 6.

The output of the amplifier 3 is further amplified by the amplifier 4 to establish a relatively steep rise in the current. The output of the amplifier 4 is fed to the triggering circuit which further squares up the wave and establishes a very steep rise and fall time.

The present invention as illustrated in the drawing has been employed to trigger an angle indicator for balancing rotating parts and balancing equipment. In such applications, the output square wave is further modified to establish a series of trigger pulses for operating an angle indicating means in accordance with the positive going zero cross-over point in the unbalance signal. The accurate maintenance of the zero cross-over point in the output square wave signal with respect to the alternating input signal establishes the angle of unbalance with an exceptionally high degree of accuracy.

The present invention thus provides an overdriven transistorized amplifying circuit having a symmetrical input which maintains the relationship at the zero cross-over points in the output and the input.

Various modes of carrying out the invention are contemplated as being within the scope of the following claims particularly pointing out and distinctly claiming the subject matter which is regarded as the invention.

I claim:

1. In an amplifier having a transistor and an input capacitor coupled to a base of the transistor and a signal source for providing a symmetrically varying input signal, a voltage divider connected to the base to establish a direct current operating voltage in the transistor characteristic, and a pair of series connected unidirectional current means connected across the voltage divider, the unidirectional current means being reversely biased by said voltage divider, the center connection of the current means being connected to said base to establish a low impedance load to the capacitor, the reverse bias of the current means preventing conduction of the current means immediately adjacent the direct current operating voltage of the transistor and thereby transmitting a small signal current to the transistor and maintaining the same zero crossover point in the input signal and the output signal of the transistor.

2. A signal squaring amplifier having a transistor and an input capacitor coupled to the input terminals of the transistor, a voltage divider connected to the transistor input to establish a quiescent operating point in the transistor characteristic, and a pair of series connected diodes connected to the voltage divider with the diodes reversely biased and having the center connection connected to the transistor input to establish a low impedance load to the capacitor, the reverse bias of the diodes being selected to prevent conduction immediately adjacent the quiescent operating point of the transistor and thereby transmitting a small signal current to the transistor and maintaining the same zero crossover point in the input signal and the output signal of the transistor.

3. In a transistor amplifying circuit including a transistor having input terminals and a signal source means for providing a symmetrically varying input signal thereto and establishing an output signal having the same zero crossover point as the input signal, means biasing the transistor to be conducting about a quiescent operating point, a low impedance circuit connected to the input terminals of the transistor and controlling passing of the input signal to the transistor, and means biasing said low impedance circuit to conduct during each half cycle after a preselected amplitude variation of the input signal from the quiescent operating point and operating substantially independently of the output signal.

4. In the transistor amplifying circuit of claim 3, a capacitive coupling connected between the signal source and the input terminals of the transistor.

5. In a transistor amplifying circuit including a transistor having input terminals and a signal source means for providing a symmetrically varying input signal thereto and establishing an output signal having the same zero crossover point as the input signal, a capacitive coupling connected between the signal source and the input terminals of the transistor, means biasing the transistor to operate about a quiescent operating point, and input circuit means connected to the input terminals of the transistor and operating substantially independently of the output signal and having biased control means operative to impress only the portion of the input signal immediately adjacent the zero crossover point of the input signal upon the transistor to prevent non-symmetrical loading of the capacitive coupling and thereby maintaining the same zero crossover point in the output signal.

6. In a transistor amplifying circuit including a transistor biased to conduct about a quiescent operating point having input terminal means and a signal source means for providing a symmetrically varying voltage signal thereto and establishing an output signal having the same zero crossover point as the input signal, said signal source means being connected to said input terminal means by a capacitive circuit, a bias correcting circuit including a pair of low impedance unidirectional current conducting means connected to the capacitive circuit and the input terminal means and presenting a symmetrical load to the capacitive circuit, and biasing means in the bias correcting circuit reverse biasing the conducting means to prevent conduction for a predetermined voltage variation adjacent the operating point of the transistor and thereby transmitting a small symmetrical portion of the signal to the transistor.

References Cited in the file of this patent

UNITED STATES PATENTS

| | | |
|---|---|---|
| 2,927,223 | Meirowitz | Mar. 1, 1960 |
| 2,997,603 | Isabeau | Aug. 22, 1961 |